(12) United States Patent
Lu et al.

(10) Patent No.: US 7,917,173 B2
(45) Date of Patent: Mar. 29, 2011

(54) MULTIMEDIA DATA COMMUNICATION METHOD AND SYSTEM

(75) Inventors: Chih-Hung Lu, Hsinchu (TW);
Chien-Chang Pan, Hsinchu (TW);
Cho-Yi Lin, Hsinchu (TW)

(73) Assignee: PixArt Imaging Inc., Hsinchu (TW)

( * ) Notice: Subject to any disclaimer, the term of this patent is extended or adjusted under 35 U.S.C. 154(b) by 960 days.

(21) Appl. No.: 11/453,158

(22) Filed: Jun. 13, 2006

(65) Prior Publication Data
US 2007/0287408 A1 Dec. 13, 2007

(51) Int. Cl.
*H04B 1/38* (2006.01)
*H04M 1/00* (2006.01)

(52) U.S. Cl. ...................... 455/557; 455/550.1

(58) Field of Classification Search .............. 455/550.1, 455/575.3, 557; 370/338; 365/185.23
See application file for complete search history.

(56) References Cited

U.S. PATENT DOCUMENTS

| | | | |
|---|---|---|---|
| 2002/0136214 A1* | 9/2002 | Do et al. | 370/392 |
| 2004/0116168 A1* | 6/2004 | Usui | 455/575.3 |
| 2004/0174831 A1* | 9/2004 | Yi et al. | 370/278 |
| 2004/0264251 A1* | 12/2004 | Cioaca | 365/185.23 |
| 2005/0117024 A1* | 6/2005 | Lee | 348/208.15 |
| 2005/0281234 A1* | 12/2005 | Kawamura et al. | 370/338 |
| 2006/0270460 A1* | 11/2006 | Konkka et al. | 455/566 |
| 2007/0159490 A1* | 7/2007 | De Greef | 345/546 |

* cited by examiner

*Primary Examiner* — George Eng
*Assistant Examiner* — Michael Faragalla
(74) *Attorney, Agent, or Firm* — Stevens & Showalter LLP (57) ABSTRACT

The present invention discloses a multimedia processing system for communicating data among a baseband module, an image sensor module, and at least one display module in a wireless mobile phone. The multimedia processing system further comprises a serial baseband interface, an image sensor interface, and a display interface which transmits and receives different kinds of data, including processing data, image data and display data, among each others. Several hardware implementations for the serial interface, including a serial peripheral interface and a universal asynchronous receiver and transmitter interface, are disclosed according to certain embodiments of the invention. Moreover, another embodiment comprises a bypass mechanism which bypasses signals to other components because under certain circumstances it is reasonable to bypass incoming data signals directly from one device to another. For example, to accelerate the image data transfer which has a changeless data structure, a direct bypass data transfer is preferable in order to improve the data transfer speed. Furthermore, the present invention also discloses another embodiment to provide a method for communicating among a baseband module, an image sensor module, and at least one display module in a wireless mobile phone. The method performs transmitting and receiving data among the mentioned modules and other components via at least one serial interface scheme.

6 Claims, 7 Drawing Sheets

MULTIMEDIA DATA COMMUNICATION METHOD AND SYSTEM

FIELD OF THE INVENTION

The present invention generally relates to a multimedia system for processing multimedia data. Particularly, certain embodiments of the invention relates to a multimedia processor of a wireless mobile phone for processing multimedia data among a baseband module, an image sensor module, and at least one display module.

BACKGROUND OF THE INVENTION

Mobile phone dominates the phone market today and its number will soon surpass that of the conventional wired telephone. Meanwhile, mobile phone equipped with camera has become a trend as well. Thus, only a mobile phone system with reliable electrical properties and fashionable appearance will lead in today's market.

A mobile phone system with a camera is usually called a multimedia mobile phone system. The multimedia mobile phone system normally has an RF (Radio Frequency) module, a baseband module, a camera, and one or two display screens. The baseband module receives radio frequency signals from the RF module; or it transmits radio frequency signals to other mobile phone systems or mobile phone stations with the assistance of the RF module. The RF module has an antenna to convert the radio frequency signals into an electromagnetic wave. Conversely, it can receive an electromagnetic wave and then convert the electromagnetic wave into a radio frequency signal for further processing by the baseband module.

In the baseband module, the radio frequency signal with high frequency carrier is sampled out from the carrier. That is, the higher frequency portion of the original radio frequency signal is filtered out. Thus, the filtered radio frequency signal falls in the range of baseband frequency. The baseband module is an interface between wireless antenna and the digital portion of the mobile phone system, which processes calling information including video or audio signals or voice signals for users. Moreover, the baseband module can transmit text messages to others through the RF module.

The baseband module may also control a display screen. The baseband module can send display information to the display screen and then show the information on the screen, creating a friendly interface between users and the machinery of the phone system. However, for a mobile phone with multimedia functions, e.g., cameras or display panels, it usually requires a multimedia module or processor. For example, the multimedia module can process images captured by a digital camera. This digital image processing includes white balance, automatic exposure, or pattern classification based on the captured scenes. In another example, the multimedia module can process video signals from the baseband module, e.g., video information sent by a friend or a movie sent by a service provider. The video may contain compressed video information including AVI (Audio Video Interleave), MPEG 2 (Moving Picture Experts Group 2), or MPEG 4 compression format, and need to be decompressed on the receiver's end. Besides the video compression standards mentioned here, there are also many compression standards relate to voice signals.

Today, the wireless mobile phones can further receive TV programs or GPS (Global Positioning System) directions from satellites. Obviously, the modern wireless mobile phone is no longer a simple device for voice application only. In order to integrate desirable multimedia functions into a compact, mobile device, a scheme should be provided such that the complex multimedia mobile phone system can handle all data correctly and in real time.

Taiwan Pat. No. I229,552 to Zhang, entitled "Method and apparatus with applications for image data transmission," discloses an apparatus that bypasses image data from an image processor to a display device without being handled by a CPU (Central Processing Unit) to buffer the image data and send the image data to the display device. The disclosure of which is hereby incorporated by reference. The function of the apparatus is similar to a DMA (Direct Memory Access) controller in a computer where the DMA controller bypasses the content of the memory to several peripheral connected devices. The resources of the CPU are therefore saved and can be used for other functions. However, the transmission method described by this patent requires complex parallel data buses, and therefore, the interconnection between each components becomes complicated.

Taiwan Pat. No. I241,821 to Zhang, entitled "Mobile phone architecture and method thereof for performing voice service and capturing or watching images simultaneously," discloses a mobile phone architecture with a switch control unit that can isolate a parallel communication between a digital baseband unit and a display module to send image data from an image processing module to the display module. The disclosure of which is hereby incorporated by reference. However, this patent only utilizes parallel scheme to transmit data between the digital baseband module and the display module. Moreover, the disclosure does not mention how to use a multimedia processor to construct a simplified mobile phone system with low cost communication scheme.

SUMMARY OF THE INVENTION

The present invention discloses a multimedia processing system for communication among a baseband module, an image sensor module, and at least one display module in a wireless mobile phone. The multimedia processing system may comprise a serial baseband interface, an image sensor interface, and a display interface. The serial baseband interface transmits and receives processing data between the multimedia processing system and the baseband module. The image sensor interface transmits and receives image data between the system and the image sensor module. The display interface transmits and receives display data between the system and the display module. In certain embodiments of the invention, the image sensor interface or the display interface may be a serial interface.

The present invention discloses a serial peripheral interface (SPI) comprising a clock signal, a data input, and a data output. The serial peripheral interface may further comprise a chip select input and a slave input. The serial peripheral interface may transmit or receive data signals synchronously with the clock signal. Moreover, the serial peripheral interface may be replaced by a universal asynchronous receiver and transmitter (UART) interface.

The present invention also discloses an image sensor interface comprising a horizontal data reference input, a vertical data reference input, and a plurality of sensor raw data inputs. The image sensor may further comprise a clock signal and a transceiver means to transmit and receive the image data.

According to one embodiment of the invention, the multimedia processing system has a display interface comprising a display write enable output, a display read enable output, and a display transceiver means to show the display data on a display panel. The display interface may use a serial communication scheme comprising a clock signal and a transceiver means to transmit and receive the display data. Moreover, a bypass signal may control the display interface to bypass the incoming signals to other connected devices directly. The multimedia processing system may also have at least one register to accommodate different interfaces.

According to another embodiment of the invention, a multimedia processing method that manages the transmitting and receiving of data among different modules is disclosed. The management of data, including processing data, image data, and display data, may utilize a serial interface scheme. The serial interface scheme may be a synchronous or an asynchronous scheme wherein the synchronous scheme may have a clock signal which synchronizes digital operations.

BRIEF DESCRIPTION OF THE DRAWINGS

Various objects and advantages of the present invention will be more readily understood by reference to the following detailed description when read in conjunction with the accompanying drawings, in which.

DESCRIPTION OF EMBODIMENTS OF THE INVENTION

Figure 1:
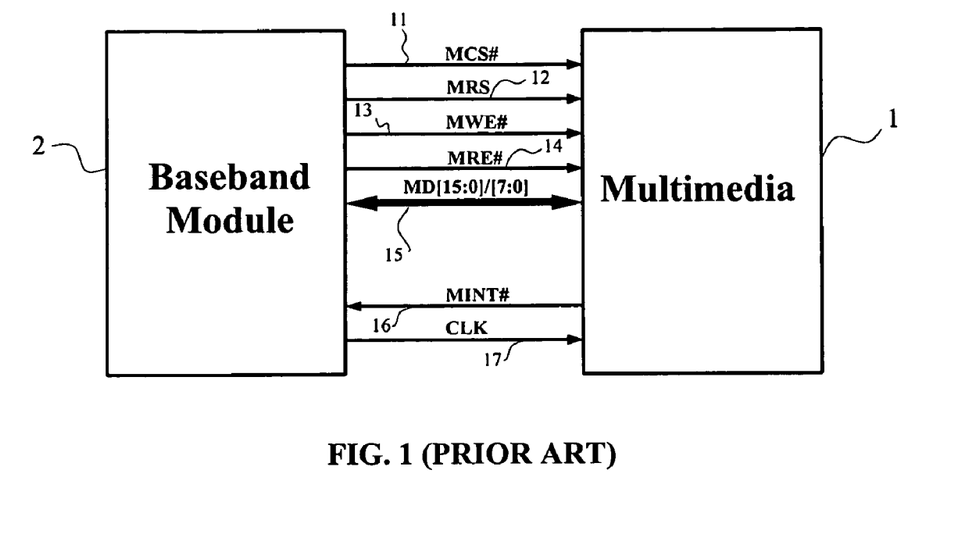
FIG. 1 is a block diagram that describes an LCM (Liquid Crystal Module) interface with eight bits or sixteen bits data bus between a baseband module and a multimedia module in the prior art.

FIG. 1 describes an LCM (Liquid Crystal Module) interface with eight bits or sixteen bits parallel data bus between a baseband module 2 and a multimedia module 1 in the prior art. A system in the prior art uses the baseband 2 to transmit and receive processing data via a LCM interface to the multimedia module 1. The LCM interface generally comprises a chip select signal MCS# 11, a register select signal MRS 12, a read enable signal MRE# 14, a write enable signal MWE# 13, an interrupt signal MINT# 16, and a clock signal CLK 17. The function of the chip select signal MCS# 11 is to activate the multimedia module 1, which may be a chip. The register select signal MRS 12 can be used to write commands in the control registers of the multimedia module 1. It also controls functions such as entering a power saving mode, discarding some image data, or resetting some peripheral devices. The baseband module 2 will activate either the read enable signal MRE# 14 or write enable signal MWE# 13 when it needs to read or write processing data. In this example, the baseband module 2 uses a parallel data bus MD[15:0]/[7:0] 15 with sixteen bits or eight bits to communicate data to the multimedia module 1. For those skilled in the art, it is well known that the interrupt signal MINT# 16 and the clock signal CLK 17 are necessary for the general microprocessors or microcontrollers to control the peripheral devices. The LCM interface shown in FIG. 1 is only for illustrative purpose. In fact, there is a need for more data buses in a multimedia mobile phone system with diverse functions. Thus, it is an object of the present invention to address these complicated data buses.

Figure 2:
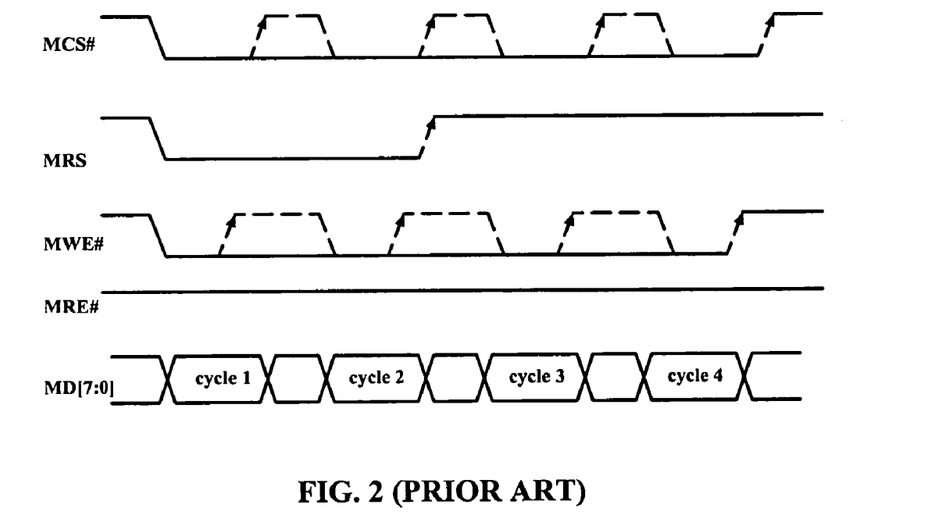
FIG. 2 is a timing waveform that describes the communicating operations of the LCM interface in the prior art.

FIG. 2 illustrates the operation timing of the LCM interface in the prior art. This figure shows that the baseband module 2 writes processing data to the multimedia module 1 through an LCM interface with eight bits data bus only. The chip select signal MCS# 11 turns low when the data on the data bus MD [7:0] 15 is ready to be written to the multimedia module 1. During cycle 1 and cycle 2, the register address data on the data bus MD [7:0] 15 are written to the multimedia module 1 when the register select signal MRS 12 is set low. During cycle 3 and cycle 4, the register value data on MD [7:0] 15 are written. In this example, the rising edges of the write enable signal MWE# 13 trigger the latching of the data on the data bus MD [7:0] 15. Other conditions, such as utilizing sixteen bits data bus or operating under read mode, are similar to the above scheme and can be easily understood by those skilled in the art. Thus, their details are not going to be described herein.

From the examples above, the prior art's parallel interface scheme requires many connecting wires, especially in the mobile phone system that has a high resolution display or a high quality voice requirement. The system needs to arrange these complicated connecting wires in a compact mobile phone. Noted that there are other devices that are integrated in a mobile phone system, such as an IrDA (Infrared Data Association) interface, a memory card interface, and an USB (Universal Serial Bus) interface. Thus, masses of connecting wires not only take up substantial inner spacing, they also create unwanted electromagnetic noises that can affect other electrical components as well as users.

Figure 3:
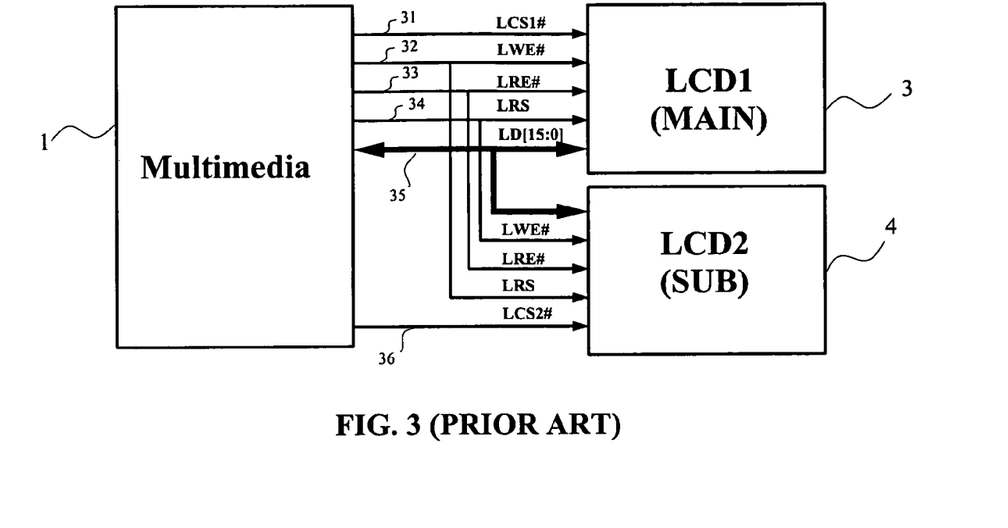
FIG. 3 is a block diagram that describes an LCD (Liquid Crystal Display) interface between a multimedia module and two LCD display modules in the prior art.

FIG. 3 describes a prior art where an LCD (Liquid Crystal Display) interface is located between a multimedia module 1 and two LCD display modules 3, 4. In this figure, same reference numbers and annotations are used as in FIGS. 1 and 2. The multimedia module 1 transmits to and receives display data from the LCD modules 3, 4 via the LCD interface which contains a main LCD chip select signal LCS1# 31, a sub LCD chip select signal LCS2# 36, an LCD register select signal LRS 34, an LCD write enable signal LWE# 32, an LCD read enable signal LRE# 33, and a plurality of display data bus LD [15:0]/LD[7:0] 35 which may be a sixteen bits data bus or eight bits data bus. The signals may be input, output, or in-out signals depending on their applications. The in-out signals perform both transmitting and receiving functions. In this example, the multimedia module 1 requires two sets of parallel control and data buses to control the display of the LCD modules 3, 4. The operations within the modules in this example are similar to those operations in the LCM interface described in FIG. 1 and FIG. 2. The control and display data buses here also create the same electromagnetic noise problem as described in FIG. 1.

Figure 4:
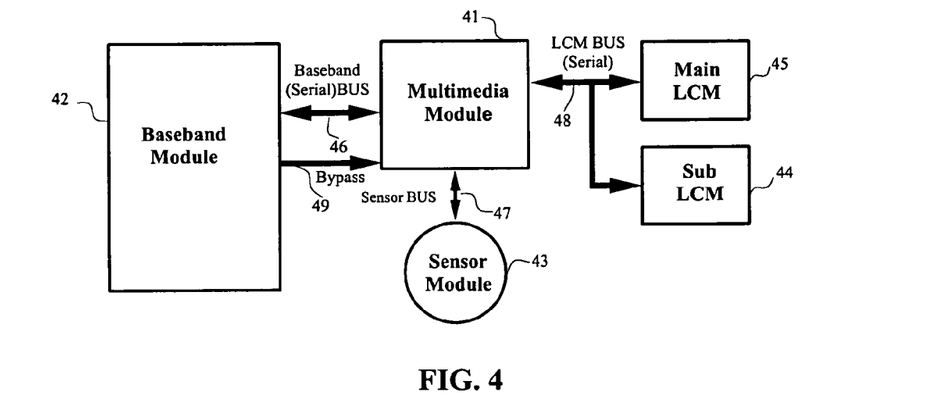
FIG. 4 is a block diagram that describes a multimedia phone system with a multimedia module communicating to at least one display module via a serial LCM bus, in accordance with an embodiment of the present invention.

FIG. 4 describes a multimedia phone system with a multimedia module communicating to at least one display module via a serial LCM bus 48. In this embodiment, a multimedia module 41 comprises a serial baseband interface, an image sensor interface, and a display interface. The serial baseband interface comprises a serial baseband bus 46. The image sensor interface comprises a sensor bus 47. The display interface comprises a serial LCM bus 48. The multimedia module 41 communicates information among a baseband module 42, an image sensor module 43, and at least one display module including a main LCM module 45 and a sub LCM module 44.

In another embodiment of the invention, the image sensor module 43 is a CMOS image sensor. However, the CMOS image sensor may be replaced by a CCD image sensor or other sensors well known to those skilled in the art. Similarly, the LCM modules 44, 45 are not limited to particular kinds of LCD display modules. Display modules which may include TFT display modules, STN display modules, color STN display modules, organic LED (OLED), or other flat panel display modules may also be used.

The baseband module 42 converts incoming RF signals to signals that have frequencies within the baseband range by removing the accompanying high frequency carrier. The baseband module 42 then processes these baseband signals and sends them to the multimedia module 41 via the serial baseband bus 46. The processed signals may comprise control signals, voice data signals, video data signals, display data signals, or other related telecommunication information. The control signals may further comprise user's instructions such as activating the image sensor module 43, listening to radio broadcasting programs, or just pressing buttons on the mobile phone. The implementation of the serial baseband bus 46 will be described later in another embodiment of the invention.

The multimedia module 41 fulfills the demanding multimedia functions embedded in the mobile phone system. An application specific multimedia module 41 can handle specific real-time functions, e.g., digital image processing algorithm, voice compression, and video compression, without occupying resources of the baseband module 42. In FIG. 4, the multimedia module 41 transmits to or receives image data from the image sensor module 43 via the sensor bus 47. To further reduce the conductive wires, the mobile phone system may employ a serial sensor interface to communicate image data between the multimedia module 41 and the image sensor module 43.

The LCM bus 48 plays a role opposite to what the sensor bus 47 does. The image sensor module 43 mainly captures images and sends image data via the sensor bus 47 to the multimedia module 41 for further processing. On the contrary, the display modules 44, 45 show what is captured by the image sensor module 43 on the display screen. Most mobile phones have two display screens, one is a main display screen and the other is a sub display screen for displaying short messages without enabling the whole mobile phone system. The LCM bus 48 may be replaced by a serial LCM bus, like the serial sensor bus, to simply the display interface between the multimedia module 41 and the display modules 44, 45.

The multimedia module 41 may further comprise a bypass mechanism to transfer incoming data signals directly to other peripheral devices. This bypass mechanism accelerates data transfer when the data are in changeless formats and simplifies presetting procedures. According to one embodiment of the invention, the bypass mechanism may comprise a bypass signal 49 from the baseband module 42 to control the multimedia module 41. The mechanism may bypass incoming processing data and transfer them directly to the LCM bus 48 when the destination of the incoming processing data is the display modules 44, 45.

Figure 5:
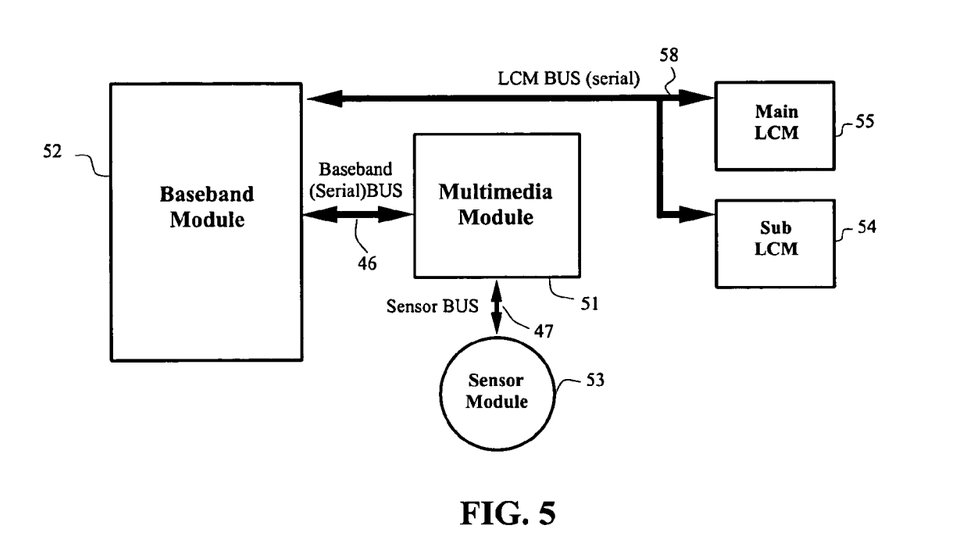
FIG. 5 is a block diagram that describes a multimedia phone system with a baseband module communicating to at least one display module via a serial LCM bus, in accordance with an embodiment of the present invention.

FIG. 5 describes a multimedia phone system with a baseband module 52 which communicates to at least one display module via a serial LCM bus 58 in another embodiment. In this figure, the reference numerals and annotations used are the same as in the previous figures. Here, a multimedia module 51 comprises a serial baseband interface and an image sensor interface. The serial baseband interface comprises a serial baseband bus 46. The image sensor interface comprises a sensor bus 47. The multimedia module communicates information between the baseband module 52 and an image sensor module 53. Furthermore, the baseband module 52 comprises a display interface which transmits display data to at least one display module including a main LCM module 55 and a sub LCM module 54 wherein the display interface may comprise the serial LCM bus 58.

Figure 6:
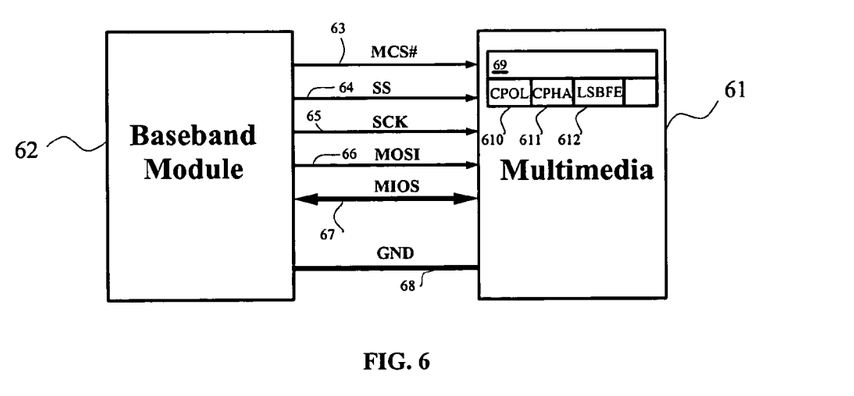
FIG. 6 is a block diagram that describes an SPI (serial peripheral interface) baseband interface, in accordance with an embodiment of the present invention.

FIG. 6 describes an SPI (serial peripheral interface) baseband interface according to another embodiment of the present invention. A serial interface transmits data serially. A serial interface comprises at least one data line and one clock line. When triggered by the clock line, the data line carries data from a host machine to a slave machine. The SPI baseband interface shown in this figure, communicating data between a baseband module 62 and a multimedia module 61, is an example illustrating an implementation of the serial scheme. The serial communication scheme of the present invention is not limited to the SPI baseband interface. Other serial interface schemes, such as UART (Universal asynchronous receiver and transmitter), are also applicable.

According to another embodiment of the invention, the burdensome parallel interface is replaced by an SPI interface which only comprises a slave select signal SS 64, a serial clock signal SCK 65, a master output/slave input MOSI 66, and a master input/slave output MISO 67. The baseband module 62 uses a chip select signal MCS# 63 to select and enable the multimedia module 61. A ground GND 68 may be optional.

When the SPI interface is on slave mode, a control register 69, comprising a clock polarity control bit CPOL 610 and a clock phase control bit CPHA 611, may assist the SPI interface to accommodate different interface standards. The CPOL bit 610 can select a non-inverted or inverted clock signal generated from either the original clock signal or supplied clock signal. The CPHA bit 611 can provide two different protocols by shifting the original clock by a half cycle. The control register 69 may have more control bits. For example, there may be control bits related to a burst read mode control. Thus, the SPI interface may burst in to read sequential processing data either from the multimedia module 61 or from the baseband module 62.

Figure 7:
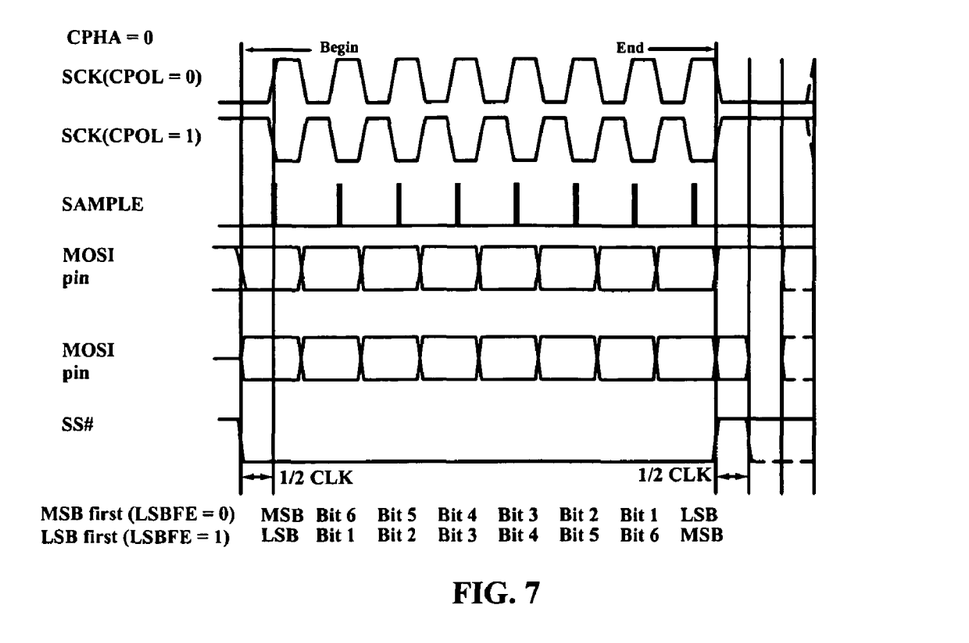
FIG. 7 is a signal waveform that describes the communicating operations of the SPI baseband interface when a register bit CPHA is set to logic 0.

FIG. 7 illustrates the communicating operations of the SPI baseband interface when a register bit CPHA 611 is set to logic 0. The default setting, logic 1 or logic 0, is usually optional. The logic 0 setting in FIG. 7 is illustrative only. Here, by setting the slave select signal SS 64 to a low level voltage, the SPI interface is in a slave mode. In the slave mode, a master SPI device outputs the serial clock signal SCK 65 to a slave SPI device. The slave select signal SS 64 is the slave select input of the multimedia module 61. Before a data transmission occurs, the slave select signal SS 64 must be set to logic low before the transmission is completed. When the SPI interface is in a master mode, the serial clock signal SCK 65 becomes an output signal to supply clock signal to other slave devices.

Figure 8:
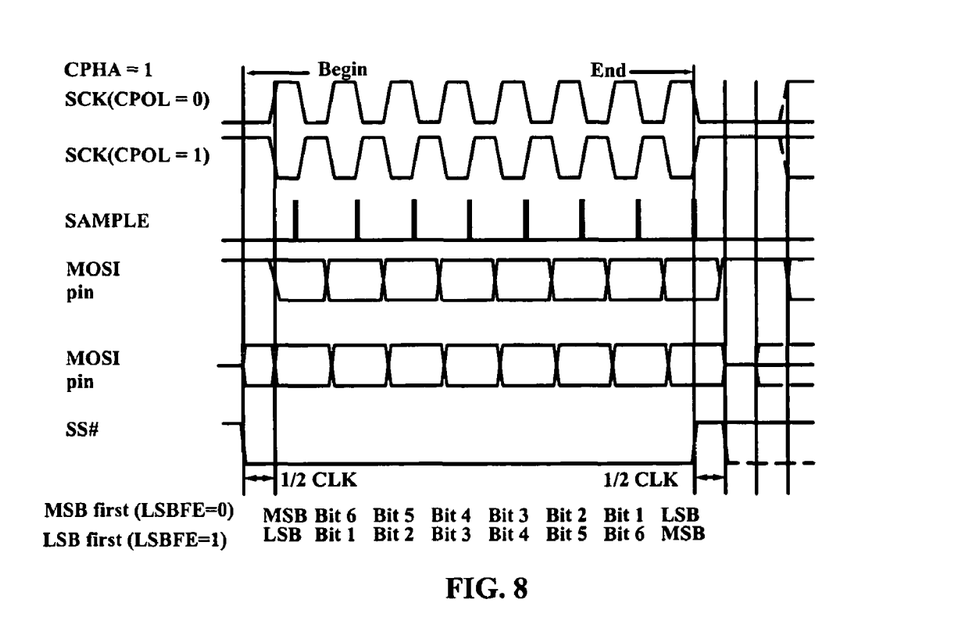
FIG. 8 is a signal waveform that describes the communicating operations of the SPI baseband interface when a register bit CPHA is set to logic 1.

In FIG. 7 and FIG. 8, the internal supplied clock SCK 65 changes its polarity according to the clock polarity control bit CPOL 610. SCK 65 becomes a clock signal either having zero phase shift or one hundred and eighty degrees phase shift. If the clock phase control bit CPHA 611 is cleared, the odd numbered edges of the serial clock SCK input 65 cause the value of the serial data slave input MOSI 66 to be latched. Even numbered edges cause the value previously latched to be shifted to the LSB of SPI buffers. On the contrary, if the clock phase control bit CPHA 611 is set, the even numbered edges will cause the value of the serial data slave input MOSI 66 to be latched. Odd numbered edges cause the value previously latched to be shifted to the LSB of SPI buffers. The sample pulses SAMPLE are generated internally to force the latch to occur. Moreover, the control register 69 in FIG. 6 may further comprise a direction control bit LSBFE 612 which determines whether the first latched bit is the MSB (Most Significant Bit) or LSB (Least Significant Bit). The operations of the SPI interface in master mode can be easily deduced from the operations in the slave mode to those skilled in the art, and, therefore, are omitted herein.

Figure 9:
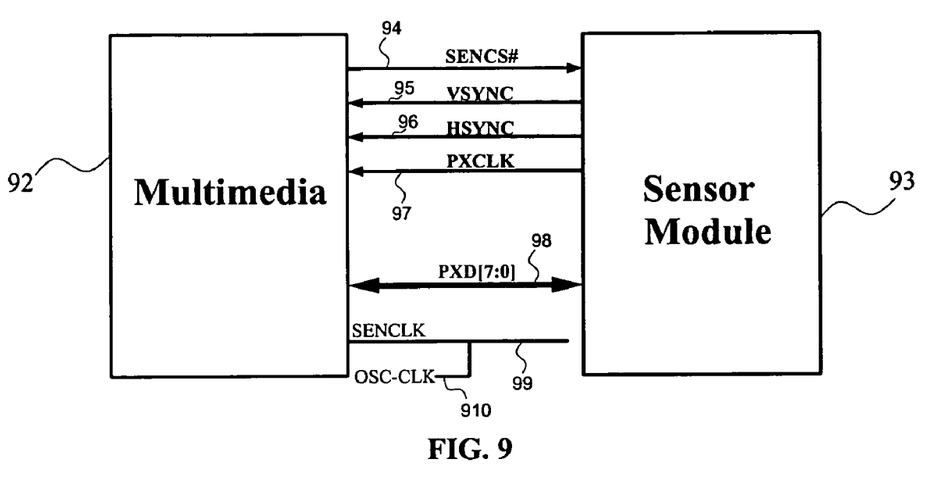
FIG. 9 is a block diagram that describes an image sensor interface according to one embodiment of the invention.

FIG. 9 describes an image sensor interface according to another embodiment of the invention. Here, the image sensor interface communicates image data between a multimedia module 92 and an image sensor module 93. The image sensor interface comprises a sensor system clock signal SENCLK 99, a sensor chip select signal SENCS# 94, a horizontal data reference signal HSYNC 96, a vertical data reference signal VSYNC 95, a sensor pixel clock signal PXCLK 97, and a sensor raw data bus PXD [7:0] 98. The sensor system clock signal SENCLK 99 may be replaced by an independent oscillation clock signal OSC-CLK 910. The sensor module 93 operates the sensor system clock signal SENCLK 99 according to the commands sent by the multimedia module 92. Moreover, the multimedia module 92 needs the sensor pixel clock PXCLK 97 to download a large amount of sensor raw data synchronously. The vertical and horizontal data reference signals, VSYNC 95 and HSYNC 96, may provide assistance to the multimedia module 92 to locate the position of each image pixel. A serial image interface comprising a sensor serial data signal and a sensor serial clock signal, similar to the serial interface mentioned above, may replace this image sensor interface.

Figure 10:
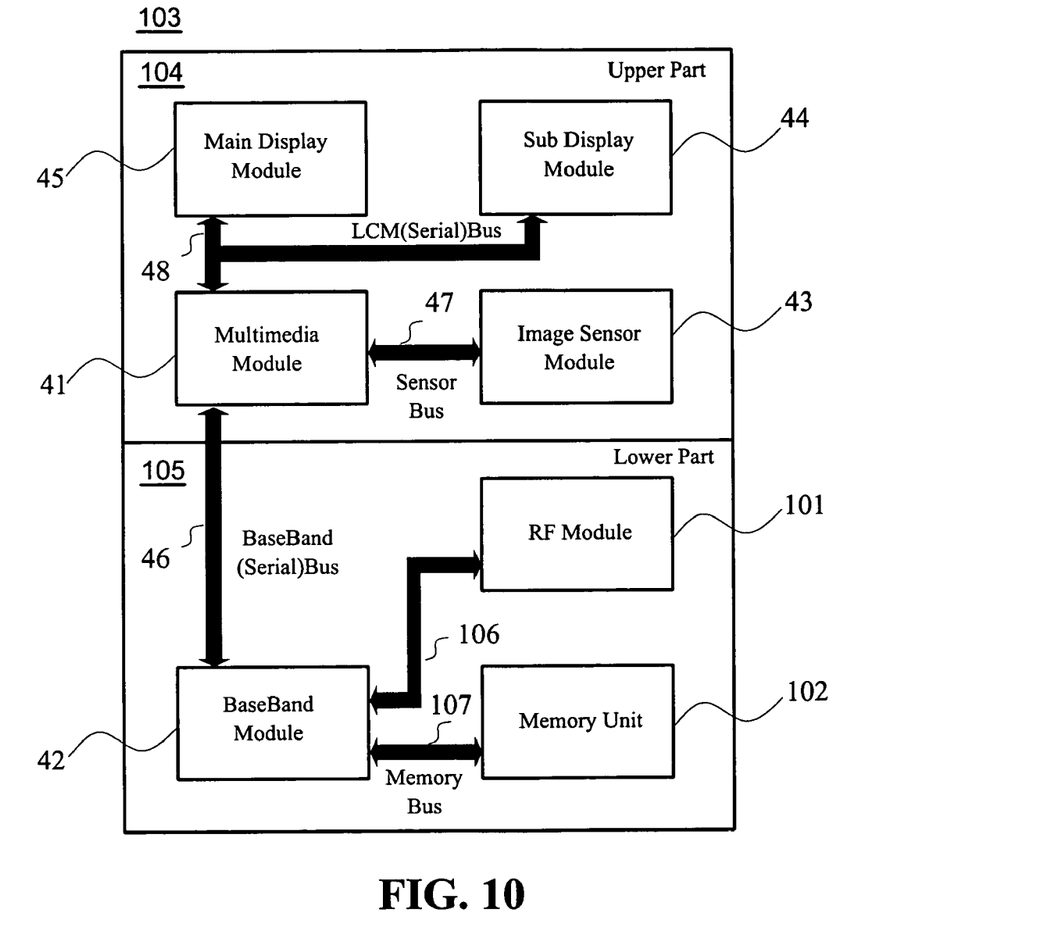
FIG. 10 describes a wireless multimedia mobile phone system according to a preferred embodiment of the present invention.

FIG. 10 illustrates a complete wireless multimedia mobile phone system 103 according to the present invention. In this figure, the reference numerals and annotations used are the same as those in the previous figures. According to one embodiment, a multimedia mobile phone system 103 comprises an upper part 104 and a lower part 105. The upper part 104 comprises a main display module 45, a sub display module 44, a multimedia module 41, and an image sensor module 43. The lower part 105 comprises a baseband module 42, an RF module 101, and a memory unit 102. There are several data buses between components in this embodiment. A serial LCM bus 48 carries display data sent from the multimedia module 41. A sensor bus 47 communicates image data between the multimedia module 41 and the image sensor module 43. A serial baseband bus 46 transmits and receives processing data between the multimedia module 41 and the baseband module 42. The baseband module 42 couples with the memory unit 102 via a memory bus 107. There may be RF metal lines 106 connected between the RF module 101 and the baseband module 42 for electrical signal integrity purposes.

Figure 11:
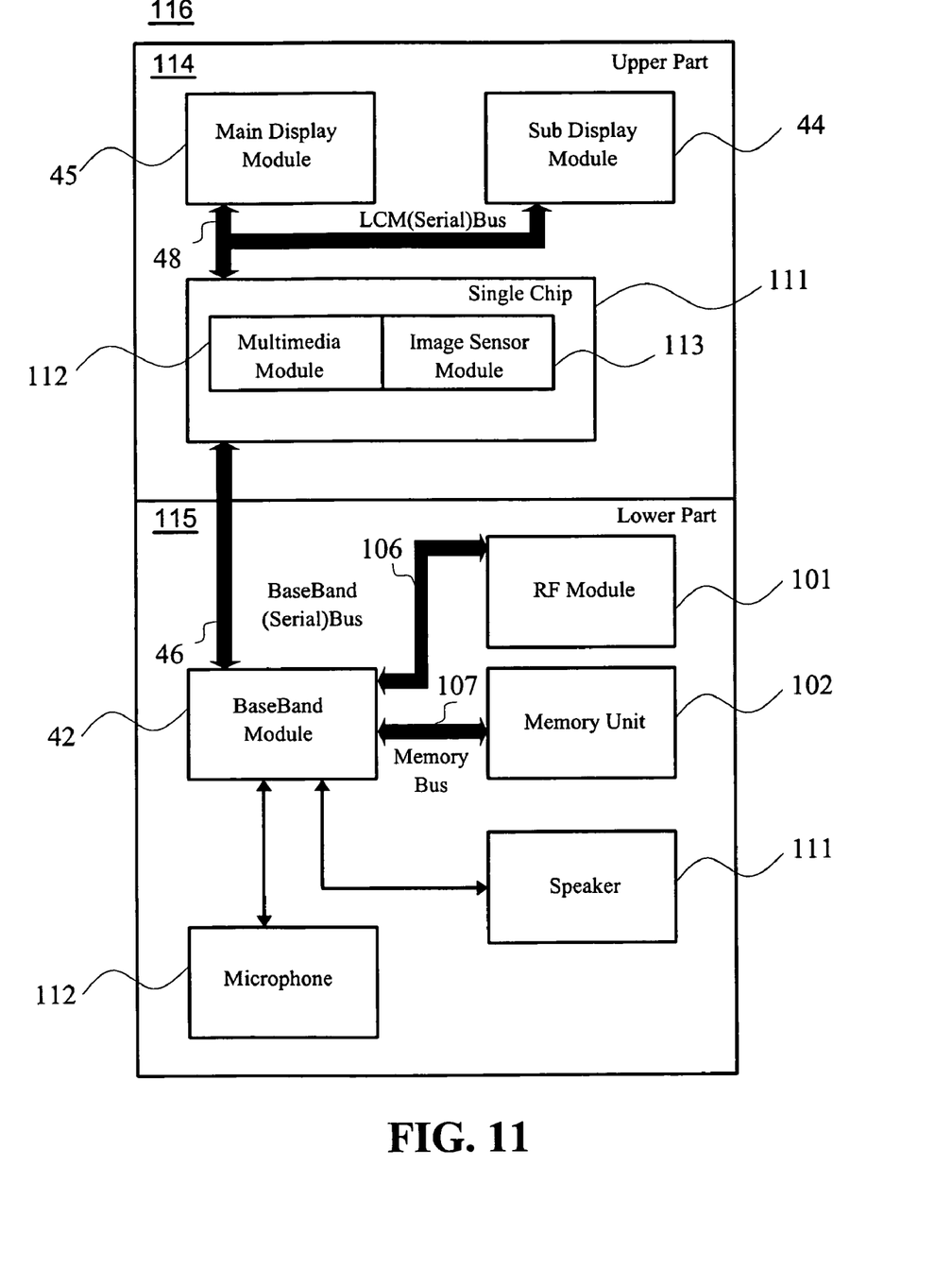
FIG. 11 describes a wireless multimedia mobile phone system according to one embodiment of the present invention.

FIG. 11 shows another embodiment of the present invention. Here, same reference numerals and annotations are used as in the previous figures. The multimedia mobile phone system 103 mentioned in FIG. 10 further comprises a speaker 111 and a microphone 112. The baseband module 42 receives audio signals from the microphone 112 and transmits the signal either to the RF module 101 or to the multimedia module 41 for voice control applications.

The baseband module 42 may transmit audio signals to the speaker 111 either from the RF module 101 for voice applications, or from the multimedia module 41 for music applications, e.g., MP3. The multimedia mobile phone system 103 may further comprise an earphone plug or an audio output plug. Thus, the music data can be transferred via an energy-saving and bandwidth-efficient serial bus.

Although certain embodiments of the invention are disclosed herein, various mobile phone systems may be implemented without departing the scope of the present invention. For example, the mentioned multimedia processing system may comprise an upper part and a lower part to fit in a clam-shell phone. On the other hand, the upper part and lower part can also be integrated into a single PCB to fit in a bar-type phone.

According to the present invention, the mobile phone system shown in FIG. 10 can be made by utilizing a serial baseband interface. Different adaptations of the system may be apparent to those skilled in the art without departing from the scope of the invention. For instance, it is possible to implement the present invention in a clam-shell phone, a slide-up phone or a bar-type phone. The serial interface may utilize an existing serial interface, e.g., I2C (Inter-Integrated Circuit) bus, RS232, or USB (Universal Serial Bus). Moreover, the fully display data or image data formats may comprise 256 colors (RGB 3:3:2), 4096 colors (RGB 4:4:4), 64K colors (RGB 5:6:5) and 256K colors (RGB 6:6:6). The serial interface may further comprise several control or clock signals to have better transmission performance.

What is claimed is:

1. A multimedia processing method for communicating among a baseband module, an image sensor module, a multimedia module and at least one display module on a mobile phone, wherein the mobile phone includes a register including a clock phase control bit, a clock polarity control bit and a burst read mode control bit, the steps comprising:

transmitting and receiving processing data serially from said baseband module;

transmitting and receiving image data from said image sensor module;

transmitting and receiving display data from said display module;

synchronizing at least one data among said processing data, said image data, and said display data according to a clock signal;

transmitting at least one data among said processing data, said image data, and said display data to said baseband module via a data output;

receiving at least one data among said processing data, said image data, and said display data from said baseband module via a data input;

activating a slave mode;

assisting a serial peripheral interface (SPI) interface to accommodate different interface standards by the clock phase control bit and the clock polarity control bit;

bursting the SPI interface to read sequential processing data from the multimedia module or from the baseband module via the burst read mode control bit; and receiving at least one data among said processing data, said image data, and said display data synchronously according to a clock signal.

2. The multimedia processing method of claim 1, wherein said transmitting and receiving image data step further comprises transmitting and receiving image data serially from said image sensor module.

3. The multimedia processing method of claim 1, wherein said transmitting and receiving display data step further comprises transmitting and receiving display data serially from said display module.

4. The multimedia processing method of claim 1, further comprising the step of:

transmitting and receiving at least one data among said processing data, said image data, and said display data, asynchronously with the baseband module.

5. The multimedia processing method of claim 1, further comprising:

activating at least one display select signal; and selecting at least one display module according to said display select signal.

6. The multimedia processing method of claim 1, further comprising:

activating a display write enable signal to write said display data to said display module; and activating a display read enable signal to read said display data from said display module.

* * * * *